(12) United States Patent
Tsai et al.

(10) Patent No.: US 12,322,948 B2
(45) Date of Patent: Jun. 3, 2025

(54) OVER CURRENT PROTECTION CIRCUIT AND OVER CURRENT PROTECTION METHOD THEREOF

(71) Applicant: Wiwynn Corporation, New Taipei (TW)

(72) Inventors: Yu-Chin Tsai, New Taipei (TW); Qi-Sheng Shi, New Taipei (TW); Kai-Sheng Chen, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 18/539,225

(22) Filed: Dec. 13, 2023

(65) Prior Publication Data
US 2024/0364092 A1    Oct. 31, 2024

(30) Foreign Application Priority Data
Apr. 27, 2023  (TW) ................... 112115803

(51) Int. Cl.
*H02H 1/00*    (2006.01)
*H02H 7/00*    (2006.01)

(52) U.S. Cl.
CPC .......... *H02H 1/0092* (2013.01); *H02H 7/008* (2013.01)

(58) Field of Classification Search
CPC .......... H02H 7/08; H02H 7/042; H02H 7/045; H02H 1/0092; H02H 1/0007; H02H 1/0046; H02H 1/06
See application file for complete search history.

(56) References Cited

U.S. PATENT DOCUMENTS

| | | | |
|---|---|---|---|
| 2006/0215335 A1* | 9/2006 | Deshpande | H02H 3/38 361/42 |
| 2008/0165461 A1* | 7/2008 | Paik | H02H 3/0935 361/87 |
| 2017/0294774 A1* | 10/2017 | Illing | H03M 1/12 |

FOREIGN PATENT DOCUMENTS

CN    109742733    5/2019

* cited by examiner

*Primary Examiner* — Nguyen Tran
(74) *Attorney, Agent, or Firm* — JCIPRNET

(57) ABSTRACT

An over current protection circuit and an over current protection method thereof are provided. The over current protection method includes: generating a reference current curve; detecting an operation current of an electronic device; calculating a first average slope of the reference current curve and a second average slope of a variation curve of the operation current; and determining whether to activate an over current protection mechanism by comparing the first average slope and the second average slope during an over current detection mechanism.

20 Claims, 4 Drawing Sheets

OVER CURRENT PROTECTION CIRCUIT AND OVER CURRENT PROTECTION METHOD THEREOF

CROSS-REFERENCE TO RELATED APPLICATION

This application claims the priority benefit of Taiwan application serial no. 112115803, filed on Apr. 27, 2023. The entirety of the above-mentioned patent application is hereby incorporated by reference herein and made a part of this specification.

BACKGROUND

Technical Field

The disclosure relates to an over current protection circuit and an over current protection method thereof, and in particular to an over current protection circuit that executes an over current protection method by judging a current trend.

Description of Related Art

In the over current protection circuit, a fixed reference current is usually set, and whether to activate the over current protection mechanism is determined by detecting whether the operation current of the protected electronic device exceeds the set reference current. However, in some embodiments, the actual maximum operation current value that the electronic device can withstand changes as the operation state changes. Therefore, activating the over current protection mechanism by comparing the operation current and the fixed reference current may easily cause the time point of the activation to be inconsistent with the actual requirement, that is, cause it to be difficult to activate the over current protection mechanism at the most appropriate time point, and may cause the electronic device to be burned.

SUMMARY

An over current protection method of the disclosure includes the following steps. A reference current curve is generated. An operation current of an electronic device is detected. A first average slope of the reference current curve and a second average slope of a variation curve of the operation current are calculated. Whether to activate an over current protection mechanism is determined by comparing the first average slope and the second average slope.

An over current protection circuit of the disclosure includes a reference current curve generator, an operation current detector, and a computation circuit. The reference current curve generator is configured to generate a reference current curve. The operation current detector is configured to detect an operation current of an electronic device. The computation circuit is coupled to the reference current curve generator and the operation current detector. The computation circuit calculates a first average slope of the reference current curve and a second average slope of a variation curve of the operation current, and determines whether to activate an over current protection mechanism by comparing the first average slope and the second average slope.

DETAILED DESCRIPTION OF DISCLOSED EMBODIMENTS

Figure 1:
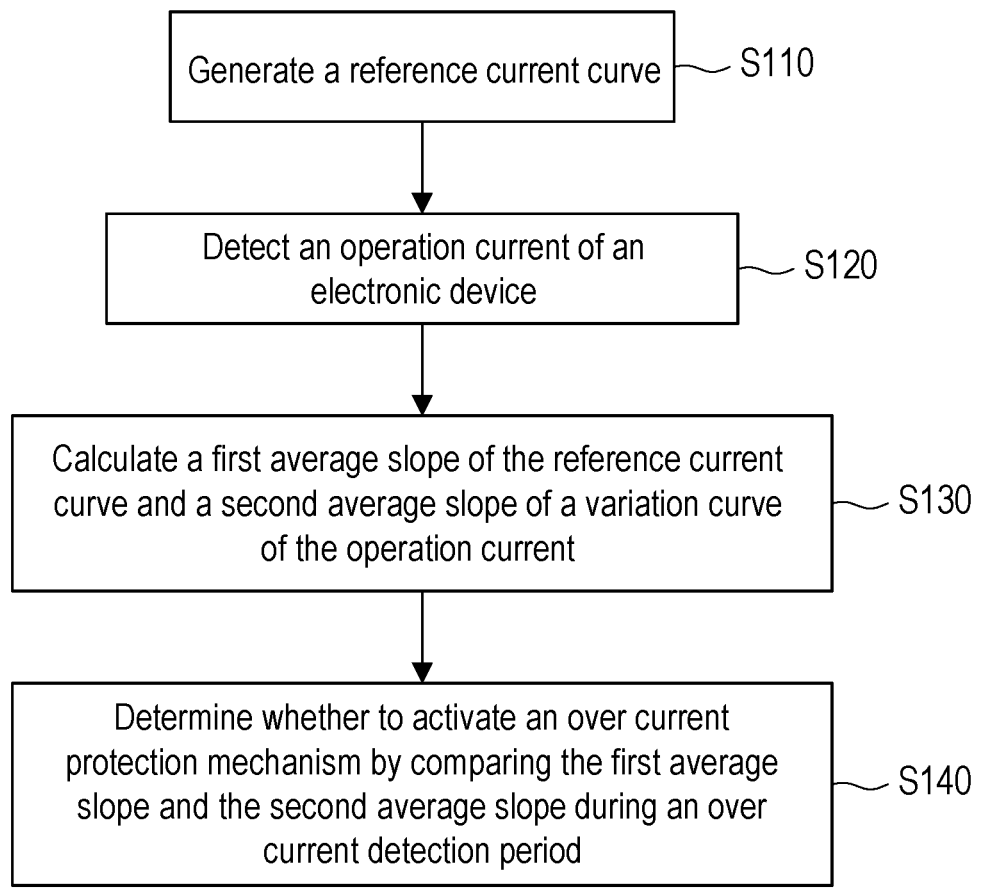
FIG. 1 is a flowchart of an over current protection method according to an embodiment of the disclosure.
Figure 2:
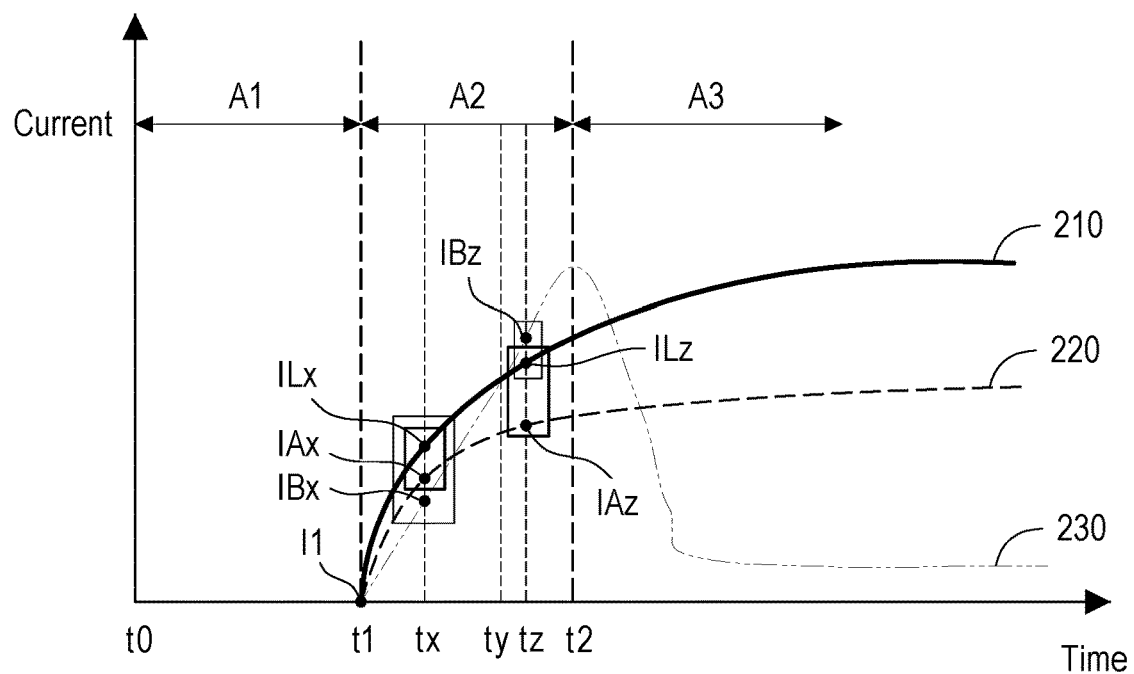
FIG. 2 is a schematic diagram of an over current protection action according to an embodiment of the disclosure.

Please refer to FIG. 1 and FIG. 2 synchronously, wherein FIG. 1 is a flowchart of an over current protection method according to an embodiment of the disclosure, and FIG. 2 is a schematic diagram of an over current protection action according to an embodiment of the disclosure. The action flow of FIG. 1 may be executed by an over current protection circuit. However, in FIG. 2, operation areas of a protected electronic device may, for example, include areas A1 to A3. The electronic device is turned off in the area A1 and does not operate. The electronic device starts to be turned on in the area A2, and the maximum operation current value the electronic device can withstand increases as the degree of turning on increases. In the area A3, the electronic device may be fully turned on, so that the operation current flowing through the electronic device may be the maximum value the electronic device can withstand.

In FIG. 1, in Step S110, a reference current curve corresponding to the electronic device may be generated. In FIG. 2, a reference current curve 210 may be generated by the over current protection circuit. The reference current curve 210 is a time-current curve. Between a time point t0 and an activation time point t1, the current value corresponding to the reference current curve 210 is equal to 0, and at the activation time point t1, the current value corresponding to the reference current curve 210 starts to rise. Furthermore, the reference current curve 210 may respectively have corresponding reference current values at different operation time points (for example, the activation time point t1 and each detection time point tx to t2).

In Step S120, the over current protection circuit may detect the operation current of the protected electronic device, and in Step S130, the over current protection circuit may calculate a first average slope of the reference current curve 210 and a second average slope of a variation curve of the operation current. In FIG. 2, the electronic device starts to operate (starts to be turned on) at the activation time point t1, the operation current flows through the electronic device, and an operation current value of the operation current may change with time. For example, the over current protection circuit may continuously detect the operation current of the electronic device from the activation time point t1 to the detection time point t2, so as to obtain the corresponding operation current values, and form variation curves 220 and 230 of the operation current accordingly.

In an embodiment, when the over current protection circuit continuously detects the operation current from the activation time point t1 to the detection time point tx, the obtained corresponding operation current values may be used to form the variation curve 220 of the operation current.

At the activation time point t1, the current value corresponding to the variation curve 220 of the operation current is substantially equal to the current value corresponding to the reference current curve 210, so the operation current value of the operation current and the reference current value of the reference current curve 210 at this time are both represented by I1. At the detection time point tx, the current value corresponding to the variation curve 220 of the operation current may be an operation current value IAx, and the current value corresponding to the reference current curve 210 may be a reference current value ILx, wherein the reference current value ILx is greater than the operation current value IAx. The over current protection circuit may calculate a first difference value between the reference current value ILx and the reference current value I1, and obtain the first average slope ($=(ILx-I1)/(tx-t1)$) of the reference current curve 210 by dividing the first difference value by a time difference value between the detection time point tx and the activation time point t1. Moreover, the over current protection circuit may calculate a second difference value between the operation current value IAx and the operation current value I1, and obtain the second average slope ($=(IAx-I1)/(tx-t1)$) of the variation curve 220 of the operation current by dividing the second difference value by the time difference value between the detection time point tx and the activation time point t1.

Next, in Step S140, the over current protection circuit may determine whether to activate an over current protection mechanism by comparing the first average slope and the second average slope during an over current detection period. Taking the variation curve 220 of the operation current as an example, based on the first average slope being greater than the second average slope, the over current protection circuit may turn off (not activate) the over current protection mechanism at the detection time point tx.

Please note here that Steps S120 to S140 are continuously executed. Since the over current protection circuit does not activate the over current protection mechanism at the detection time point tx, the operation current may be continuously detected from the detection time point tx. For example, when the detection time point tz is reached, the obtained corresponding operation current values may be used to form the variation curve 220 of the operation current. At the detection time point tz, the over current protection circuit may calculate the first average slope ($=(ILz-I1)/(tz-t1)$) of the reference current curve 210 at this time and the second average slope ($=(IAz-I1)/(tz-t1)$) of the variation curve 220 of the operation current at this time. It is known that the first average slope is greater than the second average slope by comparing the first average slope and the second average slope, so the over current protection circuit determines to turn off the over current protection mechanism.

In another embodiment, when the over current protection circuit continuously detects the operation current from the activation time point t1 to the detection time point tx, the obtained corresponding operation current values may be used to form the variation curve 230 of the operation current. At the detection time point tx, the over current protection circuit may calculate the first average slope ($=(ILx-I1)/(tx-t1)$) of the reference current curve 210 at this time and the second average slope ($=(IBx-I1)/(tx-t1)$) of the variation curve 230 of the operation current at this time. At the detection time point tx, the first average slope is greater than the second average slope, so the over current protection circuit determines to turn off the over current protection mechanism.

Next, when the over current protection circuit continuously detects the operation current from the detection time point tx to the detection time point ty, the obtained corresponding operation current values may be used to form the variation curve 230 of the operation current. At the detection time point ty, the variation curve 230 of the operation current may overlap with the reference current curve 210. At this time, the over current protection circuit may calculate that the first average slope is equal to the second average slope. Therefore, the over current protection circuit may temporarily turn off the over current protection mechanism, and provide a warning signal. Here, the warning signal may be formed in the form of sound, light emission, an electrical signal, a display image, or any combination of the above forms, and there is no particular limitation.

Subsequently, when the over current protection circuit continuously detects the operation current from the detection time point ty to the detection time point tz, the obtained corresponding operation current values may be used to form the variation curve 230 of the operation current. At the detection time point tz, the over current protection circuit may calculate the first average slope ($=(ILz-I1)/(tz-t1)$) of the reference current curve 210 at this time and the second average slope ($=(IBz-I1)/(tz-t1)$) of the variation curve 230 of the operation current at this time. At the detection time point tz, the first average slope is less than the second average slope, so the over current protection circuit may activate the over current protection mechanism, and stop the loop execution of Steps S120 to S140. In some embodiments, when the electronic device enters the area A3, the over current protection circuit may also stop the loop execution of Steps S120 to S140.

In the embodiment, when the electronic device is operating in the area A2 (during an activation period of the electronic device), under the over current protection mechanism, the over current protection circuit may turn off the protected electronic device, so as to effectively reduce the possibility of the electronic device being burned due to over current. When the over current protection mechanism is not activated (turned off), the degree of turning on of the electronic device continues to increase until the electronic device enters the area A3 (the electronic device is fully turned on).

Incidentally, in the embodiment, the reference current curve 210 may be set according to the tolerance level of the operation current of the protected electronic device, and there is no particular limitation.

Figure 3:
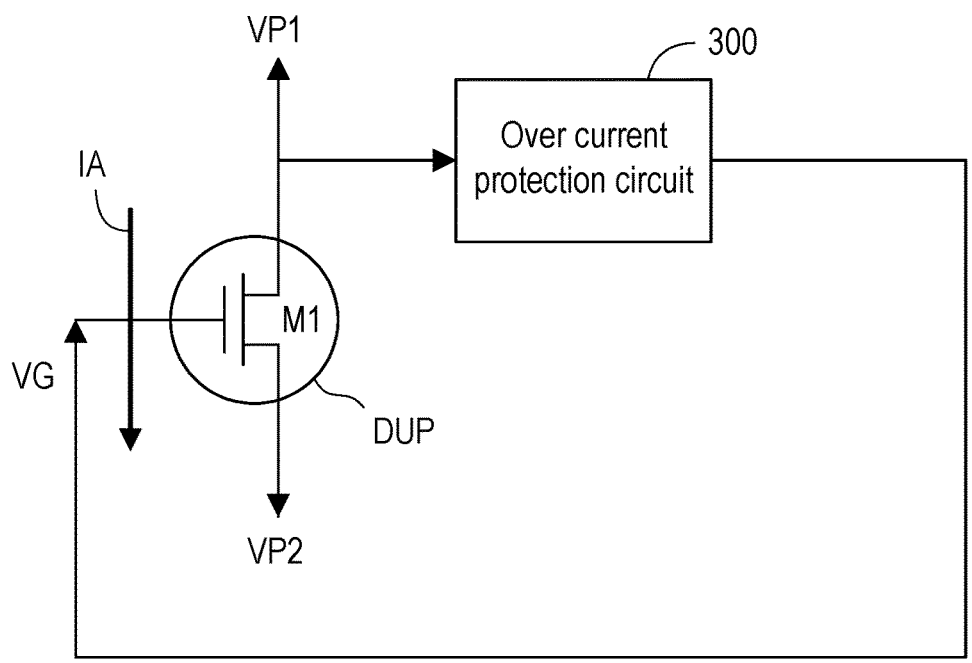
FIG. 3 is a schematic diagram of an over current protection circuit and peripheral circuits thereof according to an embodiment of the disclosure.

Please refer to FIG. 3. FIG. 3 is a schematic diagram of an over current protection circuit and peripheral circuits thereof according to an embodiment of the disclosure. In the embodiment, an electronic device DUP may be a power transistor M1, which includes a first terminal (for example, a drain) coupled to a first power rail VP1, a second terminal (for example, a source) coupled to a second power rail VP2, and a control terminal (for example, a gate). When the power transistor M1 starts to operate (starts to be conducted), the operation current flows through the power transistor M1, and an operation current value IA of the operation current may change with time.

An over current protection circuit 300 is coupled to the electronic device DUP and is configured to execute the action flow of FIG. 1. In addition, when the over current protection mechanism is activated, the over current protection circuit 300 may adjust the voltage at the control terminal of the power transistor M1, so that the power transistor M1 is cut off (turned off). When the over current protection mechanism is turned off, the over current protection circuit 300 may adjust the voltage at the control terminal of the power transistor M1 to control the degree to which the power transistor M1 is conducted (turned on) until the power transistor M1 is fully conducted (fully turned on). In other embodiments, the over current protection circuit 300 may control the degree to which the power transistor M1 is conducted or change the power transistor M1 to be cut off by generating a control signal VG.

For the implementation details of the over current protection circuit 300, please refer to the following implementations.

Figure 4:
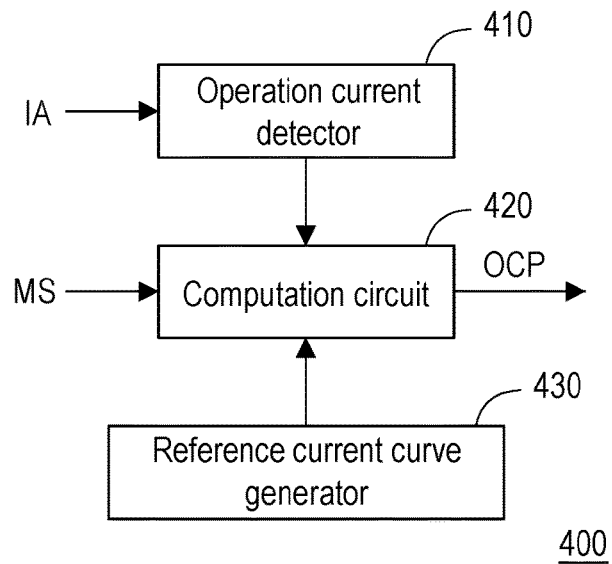
FIG. 4 is a schematic diagram of an implementation of an over current protection circuit according to an embodiment of the disclosure.

Please refer to FIG. 4. FIG. 4 is a schematic diagram of an implementation of an over current protection circuit according to an embodiment of the disclosure. An over current protection circuit 400 includes an operation current detector 410, a computation circuit 420, and a reference current curve generator 430. The operation current detector 410 is coupled to the computation circuit 420, may be coupled to the electronic device DUP as shown in FIG. 3, and is configured to detect the operation current of the protected electronic device. The reference current curve generator 430 is coupled to the computation circuit 420 and is configured to generate the reference current curve.

The computation circuit 420 may respectively obtain a first reference current value and a second reference current value corresponding to the reference current curve at the activation time point and each detection time point by the reference current curve generator 430. The computation circuit 420 may also calculate the first average slope of the reference current curve corresponding to the detection time point according to a difference value between the second reference current value and the first reference current value, and the time difference value between the detection time point and the activation time point. The computation circuit 420 may also respectively obtain a first operation current value and a second operation current value corresponding to the operation current of the electronic device at the activation time point and each detection time point by the operation current detector 410. The computation circuit 420 may also calculate the second average slope of the variation curve of the operation current corresponding to the detection time point according to a difference value between the second operation current value and the first operation current value, and the time difference value between the detection time point and the activation time point.

Further, about the over current protection mechanism, the computation circuit 420 may determine whether to activate the over current protection mechanism by comparing the calculated first average slope and second average slope. In the embodiment, the computation circuit 420 may determine whether to activate the over current detection mechanism according to an operation mode signal MS. The operation mode signal MS may be generated according to an operation state of the electronic device.

When the computation circuit 420 compares that the second average slope is greater than the first average slope, the computation circuit 420 may provide an over current protection signal OCP with a second voltage level. When the computation circuit 420 compares that the second average slope is less than the first average slope, the computation circuit 420 may provide the over current protection signal OCP with a first voltage level. The second voltage level and the first voltage level are different levels. Moreover, the over current protection signal OCP with the second voltage level may be configured to activate the over current protection mechanism, and the over current protection signal OCP with the first voltage level may be configured to turn off the over current protection mechanism. In other embodiments, when the computation circuit 420 compares that the second average slope is equal to the first average slope, an external circuit (not shown) may provide the warning signal.

Figure 5:
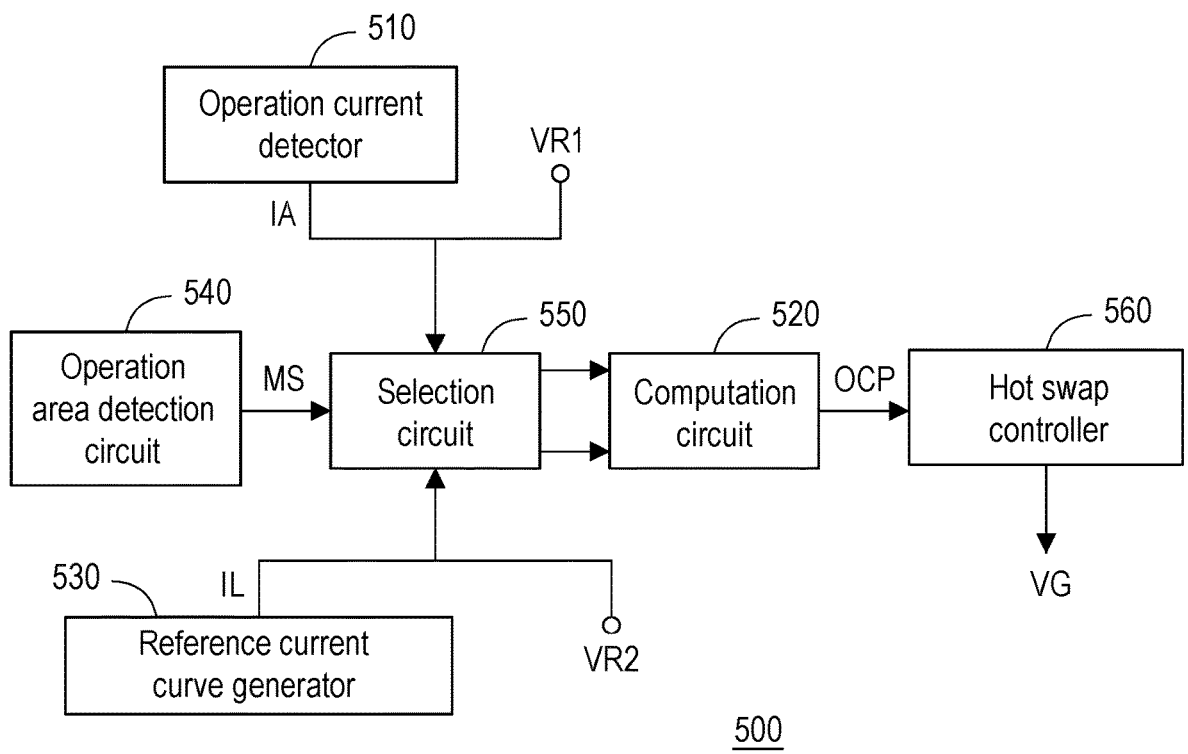
FIG. 5 is a schematic diagram of another implementation of an over current protection circuit according to an embodiment of the disclosure.

Please refer to FIG. 5. FIG. 5 is a schematic diagram of another implementation of an over current protection circuit according to an embodiment of the disclosure. An over current protection circuit 500 includes an operation current detector 510, a computation circuit 520, a reference current curve generator 530, an operation area detection circuit 540, a selection circuit 550, and a hot swap controller 560. The operation area detection circuit 540 is coupled to the selection circuit 550. The selection circuit 550 is coupled between the operation current detector 510, the computation circuit 520, and the reference current curve generator 530. The computation circuit 520 is also coupled to the hot swap controller 560.

The operation area detection circuit 540 may also be coupled to the electronic device DUP as shown in FIG. 3 and is configured to detect the operation state of the protected electronic device, and generate the operation mode signal MS according to the operation state of the electronic device.

The selection circuit 550 receives the operation mode signal MS, and selects one of the operation current value IA of the operation current provided by the operation current detector 510 and a first reference voltage VR1 at a first reference voltage terminal according to the operation mode signal MS to output. At the same time, the selection circuit 550 also selects one of a reference current value IL of a reference current curve provided by the reference current curve generator 530 and a second reference voltage VR2 at a second reference voltage terminal according to the operation mode signal MS to output. In detail, when the operation mode signal MS instructs the over current protection circuit 500 to enter the over current detection mechanism, the selection circuit 550 may determine to provide the operation current value IA and the reference current value IL to output. In contrast, when the operation mode signal MS instructs the over current protection circuit 500 not to enter the over current detection mechanism, the selection circuit 550 may determine to provide the first reference voltage VR1 and the second reference voltage VR2 to output. The first reference voltage VR1 and the second reference voltage VR2 may be reference ground voltages (for example, 0 volts).

The computation circuit 520 receives a signal output by the selection circuit 550. Further, under the over current detection mechanism, the computation circuit 520 may receive the reference current value IL and the operation current value IA, and calculate the first average slope of the reference current curve and the second average slope of the variation curve of the operation current of the electronic device according to the reference current value IL and the operation current value IA. The computation circuit 520 further compares the first average slope and the second average slope, and generates the over current protection signal OCP to activate the over current protection mechanism when the second average slope is greater than the first average slope or generates the over current protection signal OCP to turn off the over current protection mechanism when the second average slope is less than the first average slope. In other embodiments, the computation circuit 520 may also provide the warning signal by the external circuit (not shown) when the first average slope is equal to the second average slope.

The hot swap controller 560 may be coupled between the computation circuit 520 and the protected electronic device, and is configured to receive the over current protection signal OCP, and generate the control signal VG according to the over current protection signal OCP to turn on or turn off the electronic device. In detail, when the second average slope is greater than the first average slope, the hot swap controller 560 may provide the control signal VG, so that the electronic device is turned off. In contrast, when the second average slope is less than the first average slope, the hot swap controller 560 may provide the control signal VG to control the degree of turning on of the electronic device until the electronic device is fully turned on.

Figure 6:
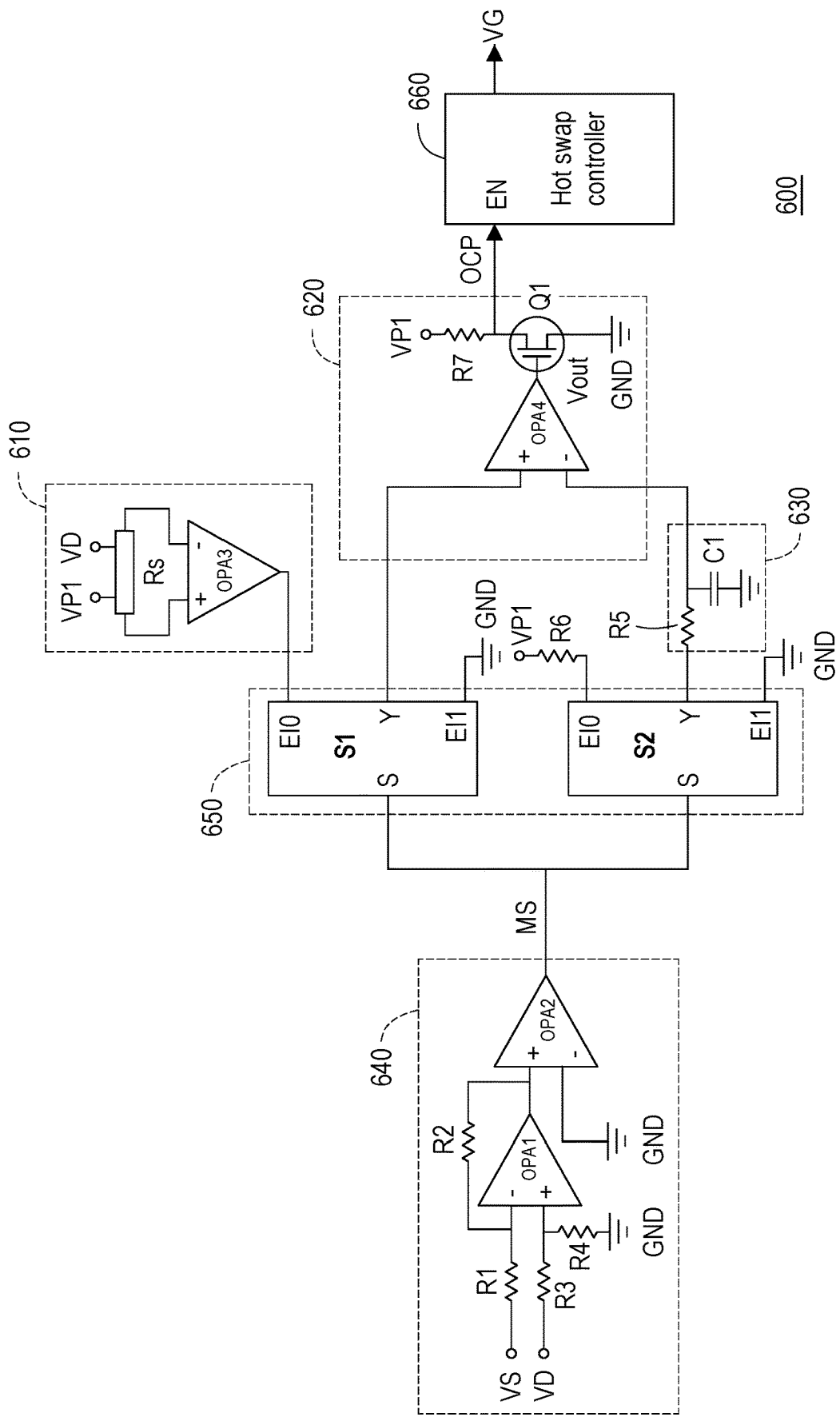
FIG. 6 is a schematic diagram of another implementation of an over current protection circuit according to an embodiment of the disclosure.

Please refer to FIG. 6 below. FIG. 6 is a schematic diagram of another implementation of an over current protection circuit according to an embodiment of the disclosure. An over current protection circuit 600 includes an operation current detector 610, a computation circuit 620, a reference current curve generator 630, an operation area detection circuit 640, a selection circuit 650, and a hot swap controller 660.

Please refer to FIG. 6 and FIG. 3 synchronously. In the embodiment, the operation area detection circuit 640 may be coupled to the power transistor M1 and is configured to receive voltages VD and VS at the first terminal and the second terminal of the power transistor M1, and detect a voltage difference between the voltages VD and VS to judge an operation state of the power transistor M1 according to the voltage difference between the voltages VD and VS and a preset threshold, thereby generating the operation mode signal MS. In some embodiments, other devices may also be included between the first power rail VP1 and the first terminal of the power transistor M1. At this time, the voltage VD may be regarded as the voltage at the first power rail VP1 minus a voltage drop generated by other devices. In some other embodiments, the voltage VD may be regarded as the voltage at the first power rail VP1. In still some embodiments, the voltage VS may be regarded as the voltage at the second power rail VP2. The operation area detection circuit 640 includes amplifiers OPA1 to OPA2 and resistors R1 to R4. A negative input terminal of the amplifier OPA1 receives the voltage VS by the resistor R1. A positive input terminal of the amplifier OPA1 receives the voltage VD by the resistor R3. The positive input terminal of the amplifier OPA1 is also coupled to a terminal of the resistor R4, and the other terminal of the resistor R4 is coupled to a reference voltage terminal GND. A positive input terminal of the amplifier OPA2 is coupled to an output terminal of the amplifier OPA1. A negative input terminal of the amplifier OPA2 is coupled to the reference voltage terminal GND. The resistor R2 is connected across the negative input terminal of the amplifier OPA1 and the positive input terminal of the amplifier OPA2. An output terminal of the amplifier OPA2 is configured to generate the operation mode signal MS.

In detail, when the voltage difference between the voltage VD and the voltage VS is greater than the preset threshold, and the voltage difference between the voltage VD and the voltage VS is less than the voltage VD, it means that the power transistor M1 starts to be conducted (starts to be activated), the operation area detection circuit 640 may correspondingly generate the operation mode signal MS with the first voltage level to activate the over current detection mechanism. In contrast, when the voltage difference between the voltage VD and the voltage VS is equal to the preset threshold, it means that the power transistor M1 is fully conducted (fully activated), and the operation area detection circuit 640 may correspondingly generate the operation mode signal MS with the second voltage level to turn off the over current detection mechanism. The preset threshold may be the voltage difference, for example, 0 volts, between the voltage VD and the voltage VS when the power transistor M1 is fully conducted. In addition, the first voltage level and the second voltage level are different levels.

A truth table of the operation area detection circuit 640 may be as follows:

| Operation state of power transistor | | |
| --- | --- | --- |
| VD − VS > VTH and VD − VS < VD | Power transistor starts to be conducted | MS = H |
| VD − VS = VTH | Power transistor is fully conducted | MS = L | where VTH is the preset threshold, H is the first voltage level (logic high level), and L is the second voltage level (logic low level).

The operation current detector 610 includes an amplifier OPA3 and a resistor Rs. Two input terminals of the amplifier OPA3 are respectively coupled to two terminals of the resistor Rs. The resistor Rs may also be connected in series between the first power rail VP1 of FIG. 3 and the first terminal of the power transistor M1. The amplifier OPA3 knows the operation current value of the operation current flowing through the power transistor M1 by detecting a voltage difference between the two terminals of the resistor Rs. The reference current curve generator 630 may be a capacitance-resistance network, which includes a resistor R5 and a capacitor C1. A first terminal of the resistor R5 is coupled to the selection circuit 650, and the capacitor C1 is coupled between a second terminal of the resistor R5 and the reference voltage terminal GND. The second terminal of the resistor R5 is coupled to the computation circuit 620.

The selection circuit 650 includes multiplexers S1 and S2. An input terminal EI0 of the multiplexer S1 is coupled to the operation current detector 610 to receive the operation current value. An input terminal EI1 of the multiplexer S1 is coupled to the reference voltage terminal GND and is configured to receive the reference ground voltage at the reference voltage terminal GND. An output terminal Y of the multiplexer S1 is coupled to the computation circuit 620. An input terminal EI0 of the multiplexer S2 is coupled to the first power rail VP1 by a resistor R6 and is configured to receive a reference system voltage at the first power rail VP1. An input terminal EI1 of the multiplexer S2 is coupled to the reference voltage terminal GND and is configured to receive the reference ground voltage at the reference voltage terminal GND. An output terminal Y of the multiplexer S2 is coupled to the first terminal of the resistor R5 in the reference current curve generator 630. Selection terminals S of the multiplexers S1 and S2 jointly receive the operation mode signal MS.

When the operation mode signal MS is the first voltage level (under the over current detection mechanism), the output terminal Y of the multiplexer S1 may output the operation current value to the computation circuit 620, and the output terminal Y of the multiplexer S2 may output the reference system voltage to the reference current curve generator 630. At this time, the reference current curve generator 630 may perform a charging action according to the reference system voltage to generate the reference current curve that changes with time, and provide the reference current value.

On the other hand, when the operation mode signal MS is the second voltage level (not under the over current detection mechanism), the output terminal Y of the multiplexer S1 may output the reference ground voltage to the computation circuit 620, and the output terminal Y of the multiplexer S2 may output the reference ground voltage to the computation circuit 620.

The computation circuit 620 includes an amplifier OPA4, a transistor Q1, and a resistor R7. The resistor R7 and the transistor Q1 are sequentially connected in series between the first power rail VP1 and the reference voltage terminal GND. A control terminal of the transistor Q1 is coupled to an output terminal of the amplifier OPA4. A positive input terminal of the amplifier OPA4 is coupled to the output terminal Y of the multiplexer S1, and a negative input terminal of the amplifier OPA4 is coupled to the output terminal Y of the multiplexer S2 by the resistor R5. When the operation mode signal MS is the first voltage level, at a detection time point, the amplifier OPA4 may compare the operation current value and the reference current value to perform a comparison action of the second average slope of the variation curve of the operation current of the power transistor M1 and the first average slope of the reference current curve. When the second average slope is greater than the first average slope, the amplifier OPA4 may generate an output voltage Vout with a logic high level, so that the transistor Q1 is conducted, and the over current protection signal OCP generated by the computation circuit 620 is thus pulled down to the reference ground voltage to have a logic low level. In contrast, when the second average slope is less than the first average slope, the amplifier OPA4 may generate the output voltage Vout with a logic low level, so that the transistor Q1 is cut off, and the over current protection signal OCP generated by the computation circuit 620 is pulled up to the reference system voltage by the resistor R7 to have a logic high level. In other embodiments, when the second average slope is equal to the first average slope, the computation circuit 620 may provide the warning signal by the external circuit (not shown).

It is worth mentioning that the operation current value and the reference current value in the embodiment are both implemented in the form of voltage.

On the other hand, when the operation mode signal MS is the second voltage level, the two input terminals of the amplifier OPA4 receive the same reference ground voltage, and generate the output voltage Vout with a logic low level, so that the transistor Q1 is cut off, and the over current protection signal OCP thus has a logic high level.

In the embodiment, a truth table of the computation circuit 620 is as follows:

| Operation state of power transistor | | Comparison action | | Output |
|---|---|---|---|---|
| MS = H | Y = EI0 | IA > IL | Vout = H | OCP = L |
| | | IA < IL | Vout = L | OCP = H |
| MS = L | Y = EI1 | | Vout = L | OCP = H | where Y=EI0 means that the input terminal EI0 and the output terminal Y in the multiplexers S1 and S2 are mutually conducted, and Y=EI1 means that the input terminal EI1 and the output terminal Y in the multiplexers S1 and S2 are mutually conducted. H is the first voltage level (logic high level), and L is the second voltage level (logic low level). IA is the operation current value, and IL is the reference current value.

The over current protection signal OCP may be provided to the hot swap controller 660. In the embodiment, the hot swap controller 660 may receive the over current protection signal OCP by an enable terminal EN thereof. Under the over current detection mechanism, when the over current protection signal OCP is a logic high level, the over current protection mechanism is turned off, and the hot swap controller 660 may be enabled. The hot swap controller 660 generates the control signal VG with a first voltage value (for example, a high voltage), and provides the control signal VG to the control terminal of the power transistor M1, so as to continuously increase the degree to which the power transistor M1 is conducted until the power transistor M1 is fully conducted. In contrast, when the over current protection signal OCP is a logic low level, the over current protection mechanism is activated, and the hot swap controller 660 may be disabled. In addition, the hot swap controller 660 may have a built-in pull low resistor to provide the control signal VG with a second voltage value (for example, a low voltage equal to the reference ground voltage) to the control terminal of the power transistor M1 by an internal pull low mechanism, so that the power transistor M1 is cut off. On the other hand, not under the over current detection mechanism, the over current protection signal OCP with a logic high level may be configured to turn off the over current protection mechanism and enable the hot swap controller 660. The hot swap controller 660 may provide the control signal VG with the first voltage value to the control terminal of the power transistor M1, so that the power transistor M1 is maintained in a fully conducted state.

In other words, in the embodiment, when the second average slope is greater than the first average slope, the over current protection circuit 600 may judge that the power transistor M1 has an over current condition, and the power transistor M1 is cut off by generating the control signal VG, so as to instantly reduce the possibility of the power transistor M1 being burned.

In summary, the over current protection circuit of the disclosure detects the second average slope of the variation curve of the operation current of the electronic device, and compares the second average slope and the first average slope of the reference current curve during the activation period of the electronic device, so as to judge whether to activate the over current protection mechanism of the electronic device. In this way, the over current protection circuit of the disclosure can activate the over current protection mechanism at the appropriate time point, so as to effectively reduce the possibility of the electronic device being burned due to over current, and improve the safety of the system.

What is claimed is:

1. An over current protection method, comprising:
  generating a reference current curve;
  detecting an operation current of an electronic device;
  calculating a first average slope of the reference current curve and a second average slope of a variation curve of the operation current; and
  determining whether to activate an over current protection mechanism by comparing the first average slope and the second average slope.

2. The over current protection method according to claim 1, wherein the step of calculating the first average slope of the reference current curve comprises:
  obtaining a first reference current value of the reference current curve corresponding to an activation time point;
  obtaining a second reference current value of the reference current curve corresponding to a detection time point; and
  calculating the first average slope according to a difference value between the second reference current value and the first reference current value, and a time difference value between the detection time point and the activation time point.

3. The over current protection method according to claim 2, wherein the step of calculating the second average slope of the variation curve of the operation current comprises:
   obtaining a first operation current value of the operation current corresponding to the activation time point;
   obtaining a second operation current value of the operation current corresponding to the detection time point; and
   calculating the second average slope according to a difference value between the second operation current value and the first operation current value, and a time difference value between the detection time point and the activation time point.

4. The over current protection method according to claim 1, further comprising:
   activating the over current protection mechanism when the second average slope is greater than the first average slope; or
   turning off the over current protection mechanism when the second average slope is less than the first average slope.

5. The over current protection method according to claim 1, further comprising:
   providing a warning signal when the second average slope is equal to the first average slope.

6. The over current protection method according to claim 4, further comprising:
   turning off the electronic device when the over current protection mechanism is activated; or
   continuously increasing a degree of turning on of the electronic device until the electronic device is fully turned on when the over current protection mechanism is turned off.

7. The over current protection method according to claim 4, wherein the electronic device is a power transistor, the over current protection method further comprising:
   adjusting a voltage at a control terminal of the power transistor, so that the power transistor is cut off when the over current protection mechanism is activated; or
   adjusting the voltage at the control terminal of the power transistor to control a degree to which the power transistor is conducted when the over current protection mechanism is turned off.

8. The over current protection method according to claim 7, further comprising:
   detecting a voltage difference between a first terminal and a second terminal of the power transistor;
   activating the over current detection mechanism when the voltage difference between the first terminal and the second terminal of the power transistor is less than a voltage at the first terminal of the power transistor and greater than a preset threshold; or
   turning off the over current detection mechanism when the voltage difference between the first terminal and the second terminal of the power transistor is equal to the preset threshold.

9. An over current protection circuit, configured to protect an electronic device, comprising:
   a reference current curve generator, configured to generate a reference current curve;
   an operation current detector, configured to detect an operation current of the electronic device; and
   a computation circuit, coupled to the reference current curve generator and the operation current detector, and configured to calculate a first average slope of the reference current curve and a second average slope of a variation curve of the operation current, and determine whether to activate an over current protection mechanism by comparing the first average slope and the second average slope.

10. The over current protection circuit according to claim 9, wherein the computation circuit is configured to:
    obtain a first reference current value of the reference current curve corresponding to an activation time point;
    obtain a second reference current value of the reference current curve corresponding to a detection time point; and
    calculate the first average slope according to a difference value between the second reference current value and the first reference current value, and a time difference value between the detection time point and the activation time point.

11. The over current protection circuit according to claim 10, wherein the computation circuit is further configured to:
    obtain a first operation current value of the operation current corresponding to the activation time point;
    obtain a second operation current value of the operation current corresponding to the detection time point; and
    calculate the second average slope according to a difference value between the second operation current value and the first operation current value, and a time difference value between the detection time point and the activation time point.

12. The over current protection circuit according to claim 9, wherein the computation circuit compares the first average slope and the second average slope, and the computation circuit provides an over current protection signal with a second voltage level to activate the over current protection mechanism when the second average slope is greater than the first average slope; or the computation circuit provides the over current protection signal with a first voltage level to turn off the over current protection mechanism when the second average slope is less than the first average slope.

13. The over current protection circuit according to claim 9, wherein the computation circuit compares the first average slope and the second average slope, and the computation circuit provides a warning signal by an external circuit when the second average slope is equal to the first average slope.

14. The over current protection circuit according to claim 12, wherein the electronic device is turned off when the over current protection mechanism is activated; or a degree of turning on of the electronic device is continuously increased until the electronic device is fully turned on when the over current protection mechanism is turned off.

15. The over current protection circuit according to claim 12, further comprising:
    a hot swap controller, coupled between the computation circuit and the electronic device, and configured to receive the over current protection signal, and generate a control signal according to the over current protection signal to turn on or turn off the electronic device.

16. The over current protection circuit according to claim 15, wherein the hot swap controller receives the over current protection signal by an enable terminal, and the hot swap controller is enabled, so that the control signal is a first voltage value to continuously increase a degree of turning on of the electronic device when the over current protection mechanism is turned off; or the hot swap controller is disabled, so that the control signal is a second voltage value to turn off the electronic device when the over current protection mechanism is activated.

17. The over current protection circuit according to claim 9, further comprising:
- an operation area detection circuit, coupled as the electronic device of a power transistor and configured to detect a voltage difference between a first terminal and a second terminal of the power transistor, and generate an operation mode signal according to the voltage difference between the first terminal and the second terminal of the power transistor and a preset threshold; and
- a selection circuit, coupled to the operation area detection circuit, coupled between the reference current curve generator, the operation current detector, and the computation circuit, and configured to receive the operation mode signal, and determine to provide a reference current value of the reference current curve and an operation current value of the operation current to the computation circuit according to the operation mode signal.

18. The over current protection circuit according to claim 17, wherein the operation area detection circuit generates the operation mode signal to activate the over current detection mechanism when the voltage difference between the first terminal and the second terminal of the power transistor is less than a voltage at the first terminal of the power transistor and greater than the preset threshold; or the operation area detection circuit generates the operation mode signal to turn off the over current detection mechanism when the voltage difference between the first terminal and the second terminal of the power transistor is equal to the preset threshold.

19. The over current protection circuit according to claim 18, wherein the selection circuit provides the reference current value of the reference current curve and the operation current value of the operation current to the computation circuit when the over current detection mechanism is activated; or the selection circuit provides a first reference voltage and a second reference voltage to the computation circuit when the over current detection mechanism is turned off.

20. The over current protection circuit according to claim 9, wherein the reference current curve generator is a capacitance-resistance network and is configured to generate the reference current curve by performing a charging operation according to a reference system voltage.

* * * * *